United States Patent

[11] 3,550,631

| [72] | Inventors | Robert D. Vanderlaan;<br>Richard J. Lappin, Kalamazoo, Mich. |
|---|---|---|
| [21] | Appl. No. | 737,752 |
| [22] | Filed | June 17, 1968 |
| [45] | Patented | Dec. 29, 1970 |
| [73] | Assignee | Pneumo Dynamics Corporation<br>Cleveland, Ohio<br>a corporation of Delaware |

[54] VALVE PLUNGER DRIVE MECHANISM
11 Claims, 3 Drawing Figs.

[52] U.S. Cl. ................................................. 137/625.65
[51] Int. Cl. .................................................... F16k 11/07
[50] Field of Search ........................................... 137/625.64,
625.65, 625.68, 625.69

[56] References Cited
UNITED STATES PATENTS

| 2,994,304 | 8/1961 | Shultz | 137/625.69X |
| 2,864,340 | 12/1958 | Hruska | 137/625.68 |
| 2,958,340 | 11/1960 | Rosebrook | 137/625.69 |
| 2,973,747 | 3/1961 | Folkerts | 137/625.68 |
| 3,083,940 | 4/1963 | Armytage | 137/625.69 |
| 3,253,613 | 5/1966 | Richolt | 137/625.69X |

*Primary Examiner*—Henry T. Klinksiek
*Attorney*—Stephen M. Mihaly

ABSTRACT: A valve plunger drive mechanism including a piston in the valve plunger pressure engageable with the valve plunger actuator for eliminating axial play, and an adjusting screw for attaining a predetermined clearance with the valve plunger actuator prior to pressure actuation of the piston. The end of the valve plunger actuator is spherical and the adjacent faces of the piston and adjusting screw are either flat or cylindrical to eliminate side load friction due to part tolerances.

PATENTED DEC 29 1970
3,550,631
Fig.1
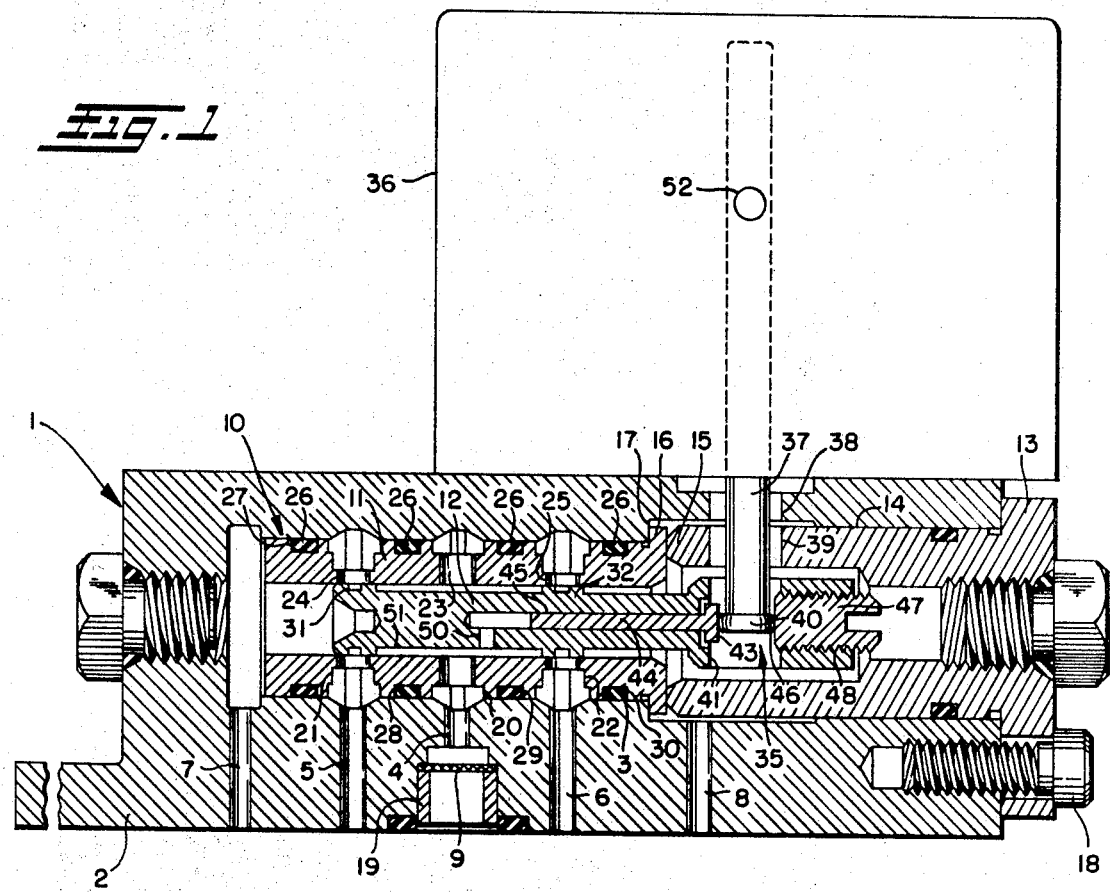
Fig.2
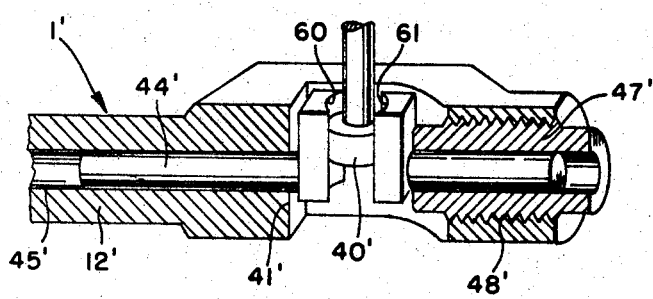
Fig.3
INVENTORS
ROBERT D. VANDERLAAN
RICHARD J. LAPPIN
BY Stephen M. Mihaly
ATTORNEY 3,550,631

VALVE PLUNGER DRIVE MECHANISM

BACKGROUND OF THE INVENTION

This invention relates generally as indicated to a valve plunger drive mechanism and more particularly to a novel drive mechanism for actuating the valve plunger without any lag due to mechanical backlash and without imposing any side load friction thereon.

There are many instances in which a servovalve must be capable of supplying pressure and flow over a wide range, as for example where the servovalve is being used to control the movement of a fluid motor over a range of speeds of from say 5 to 7,200 r.p.m., which speeds must be proportional in either direction to a command signal voltage over that entire range. If the level of accuracy required for such a device is to be maintained, mechanical backlash and friction between the valve plunger of the servovalve and the drive mechanism therefor cannot be tolerated.

Conventional techniques of attaching the valve plunger rigidly to a torque motor shaft by a long, slender quill are not suitable for this purpose, since any quill flexible enough to assure the required negligible friction-generating side loads on the valve plunger would not be structurally stiff enough to support the maximum required torque motor output loads, which may exceed 9.5 pounds.

SUMMARY OF THE INVENTION

With the foregoing in mind, it is a principal object of this invention to provide a valve plunger drive mechanism which is capable of transmitting the relatively high output loads required while substantially eliminating backlash or end play between the valve plunger actuator and valve plunger.

Another object is to provide such a valve plunger drive mechanism which minimizes the points of possible mechanical friction between the valve plunger actuator and valve plunger and controls maximum friction at these points.

A further object is to provide such a valve plunger drive mechanism which is relatively simple in nature, inexpensive in construction, and can be easily manufactured, assembled, and adjusted.

These and other objects of the present invention may be achieved by providing a piston in the valve plunger pressure engageable with one side of the valve plunger actuator to remove all backlash or axial play. An adjusting screw engageable with the opposite side of the valve plunger actuator may be preset to attain a predetermined clearance therewith prior to actuation of the piston, thus greatly simplifying the assembly operation and eliminating potential damage on assembly. The valve plunger actuator has a spherical portion engageable by flat or cylindrical faces on the piston and adjusting screw to eliminate side load friction due to part tolerances. If cylindrical surfaces are used, the radius should be slightly larger than the ball end on the actuator to create point contact.

BRIEF DESCRIPTION OF THE DRAWING

In the annexed drawing:

FIG. 1 is a longitudinal section through a servovalve showing a preferred form of drive mechanism in accordance with this invention for the valve plunger;

FIG. 2 is an enlarged fragmentary longitudinal section of the valve plunger drive mechanism of FIG. 1; and FIG. 3 is an enlarged perspective view partly in section of a modified form of valve plunger drive mechanism.

DESCRIPTION OF THE PREFERRED EMBODIMENTS

Referring now in detail to the drawing and first especially to FIG. 1, there is shown a servovalve 1 including a valve housing 2 having an axial bore 3 therein axially intersected along its length in usual fashion by a central inlet passage 4, a pair of cylinder passages 5, 6 straddling the inlet passage 4, and a pair of return passages 7, 8 straddling the cylinder passages 5, 6. A disc filter 9 may be inserted in the inlet passage 4 where it is retained by a filter retaining ring 19. Contained within the axial bore 3 is a valve assembly 10 in the form of a sleeve member 11 having a valve plunger 12 axially movable therein. The sleeve member 11 is retained in place by a sleeve retainer 13 inserted in a counterbore 14 with its inner end 15 pressing an out-turned flange 16 on the sleeve member 11 into engagement with a stop shoulder 17 formed by the intersection of the counterbore 14 and bore 3. Suitable fasteners 18 may be used to secure the sleeve retainer 13 to the valve housing 2.

The sleeve member 11 has a plurality of axially spaced external grooves 20, 21, and 22 respectively communicating with the inlet passage 4 and cylinder passages 5 and 6 and with the interior of the sleeve member 11 through radial apertures 23, 24, and 25 therein. Suitable packings 26 disposed in external grooves 27 through 30 in the sleeve member 11 prevent external leakage of fluid between the various passages 4 through 8.

In the neutral position shown, the axially spaced lands 31, 32 on the valve plunger 12 respectively cover the radial apertures 24 and 25 leading to the cylinder passages 5 and 6 thereby blocking communication between the cylinder passages 5 and 6 and inlet passage 4 as well as between such cylinder passages and the return passages 7, 8. As apparent, axial movement of the valve plunger 12 to the left as seen in FIG. 1 will connect the inlet passage 4 with the cylinder passage 5 and cylinder passage 6 with the return passage 8, whereas movement of the valve plunger 12 to the right will connect such inlet passage 4 with the cylinder passage 6 and cylinder passage 5 with the return passage 7, in a manner well known in the art. Such axial movements of the valve plunger 12 are controlled by a valve plunger drive mechanism 35 which in the form shown in FIGS. 1 and 2 comprises a torque motor 36 having an elongated, relatively nonflexible torque motor shaft or valve plunger actuator 37 extending through aligned openings 38 and 39 in the valve housing 2 and sleeve retainer 13, respectively, for receipt of its spherical end portion 40 in a transverse bore 41 in the outer end of the valve plunger 12. Such spherical portion 40 is engageable on opposite sides by the enlarged flat head 43 of a small piston 44 inserted in an axial bore 45 in the valve plunger 12 and the parallel flat end face 46 of an adjusting screw 47 threadedly received in an axial counterbore 48 in the valve plunger 12.

Before assembling the servovalve 1, the adjusting screw 47 is preset with a standard gage to attain a small predetermined clearance of approximately .001 to .003 inch between the adjacent flat head 43 of the piston 44 and the spherical portion 40 of the torque motor shaft 37 with the flat head 43 seated in a counterbore at the end of the bore 45. After assembly, the system is pressurized to permit the inlet passage pressure to act on the inner end of the piston 44 via a radial passage 50 in the valve plunger 12 which communicates the valve plunger bore 45 with the annular groove 51 between the spaced apart lands 31, 32, forcing forcing the piston 44 against the spherical end 40 of the torque motor shaft 37 with a predetermined pressure to remove all mechanical backlash or axial play therebetween.

At the same time, plunger side load friction is eliminated due to contact of the flat and parallel surfaces 43 and 46 on the piston 44 and adjusting screw 47, respectively, with the spherical end surface 40 of the torque motor shaft 37 which permits freedom of movement of the torque motor shaft 37 to the extent necessary to compensate for tolerance variations in the transverse plane. The effect of axial part tolerances in nulling out the valve may also be eliminated by axial adjustment of the torque motor 36 on the valve housing 2.

Friction between the piston 44 and torque motor shafts 37 is kept to a minimum by keeping the load that the piston imparts on the torque motor shaft quite small. This load need only represent a fraction of the force that the torque motor 36 is capable of producing, since it only has to be slightly larger than the force required to move the valve plunger 12 in its sleeve 11. As an example, the piston load may be about 2 pounds for a supply pressure of 1,500 p.s.i. where the torque motor is capable of producing a minimum of 9.5 pounds. Should dirt or silt in the actuating fluid require a force greater than 2 pounds to stroke the valve plunger 12, the piston 44 will slide in the plunger to the extent of the clearance (in this case from .001 to .003 inch), after which the piston and valve plunger will move together so that the full force of the torque motor can be applied to the valve plunger to free it.

To actuate the valve plunger 12, a command signal is supplied to the torque motor 36 which causes the torque motor shaft 37 to swing about its pivot 52 either to the left or right thus causing a corresponding axial movement of the valve plunger 12 in the same direction. As the torque motor shaft 37 strokes its maximum amount, the spherical end 40 thereof will rise a distance d of approximately .00009 inch, as exaggerated in FIG. 2. By making the diametral clearance P between the piston 44 and valve plunger 12 slightly greater than that, the piston will be able to "float" through its clearance so that any frictional sliding motion between the spherical surface 40 and piston head 43 will be minimized.

Such clearance P between the piston 44 and valve plunger 12 can be relatively large without resulting in appreciable leakage, since the piston is relatively long, and any silting that does occur within the clearance is not detrimental to valve function because the piston does not normally have to move in the plunger. With large clearances, the piston 44 and valve plunger 12 may be made interchangeable without requiring match fitting of the various pieces.

When the torque motor output forces are approximately 9.5 pounds or less, the flat surfaces 43 and 46 on the piston head and adjusting screw are quite effective in eliminating side load friction. However, where greater torque motor output forces are contemplated, the piston head and adjusting screw surfaces 60 and 61 are desirably made cylindrical as shown in FIG. 3, and the spherical end 40 of the torque motor shaft 37 is slightly transversely offset from the axis of the piston 44' and adjusting screw 47' so that misalignment in the transverse plane due to part tolerances will not induce plunger side load friction. Otherwise, the construction of the valve plunger 12' of FIG. 3 is substantially the same as that shown in FIG. 1 and accordingly the same reference numerals followed by a prime symbol are used to designate like parts.

From the above discussion, it can now be seen that the valve plunger drive mechanism of the present invention substantially eliminates backlash or end play between the torque motor shaft and valve plunger, and minimizes the points of possible friction therebetween, as well as the amount of friction at these points. Moreover, the valve plunger drive mechanism is of a relatively simple and inexpensive construction which can be easily manufactured, assembled, and adjusted.

We claim:

1. A servovalve comprising a housing containing a plurality of flow passages, and a valve plunger axially movable in said housing for selectively blocking and establishing communication between said flow passages; wherein the improvement comprises a valve plunger drive mechanism for effecting such axial movements of said valve plunger, said valve plunger drive mechanism including an elongated valve plunger actuator extending into a transverse opening in said valve plunger, a piston contained in an axial bore in said valve plunger communicating with said transverse opening therein, and means providing fluid pressure actuation of said piston into engagement with one side of said valve plunger actuator to eliminate axial play between said valve plunger and valve plunger actuator.

2. The servovalve of claim 1 wherein said means providing fluid pressure actuation of said piston comprises a radial passage in said valve plunger communicating the axial bore in said valve plunger inwardly of said piston with a fluid pressure source.

3. A servovalve comprising a housing containing a plurality of flow passages, and a valve plunger axially movable in said housing for selectively blocking and establishing communication between said flow passages; wherein the improvement comprises a valve plunger drive mechanism for effecting such axial movements of said valve plunger, said valve plunger drive mechanism including an elongated valve plunger actuator extending into a transverse opening in said valve plunger, a piston contained in an axial bore in said valve plunger communicating with said transverse opening therein, means urging said piston into engagement with one side of said valve plunger actuator to eliminate axial play between said valve plunger and valve plunger actuator, and an adjusting screw threadedly received in another bore in said valve plunger communicating with sad transverse opening on the opposite side of said valve plunger actuator, said adjusting screw being preset to establish a predetermined small clearance between said valve plunger and valve plunger actuator when said piston is seated in said axial bore which is taken up by the force urging said piston toward said valve plunger actuator.

4. The servovalve of claim 3 wherein said valve plunger actuator has a spherical portion engageable on opposite sides by parallel flat faces on said piston and adjusting screw to eliminate side load friction.

5. The servovalve of claim 3 wherein said valve plunger actuator has a spherical portion engageable on opposite sides by cylindrical faces on said piston and adjusting screw to eliminate side load friction.

6. The servovalve of claim 5 wherein said spherical portion on said valve plunger actuator is transversely offset from the axis of said piston and adjusting screw so that misalignment in the transverse plane due to part tolerances will not induce side load friction.

7. The servovalve of claim 5 wherein said cylindrical surfaces have a radius slightly larger than said spherical portion to provide point contact therebetween.

8. The servovalve of claim 3 further comprising means mounting said valve plunger actuator for pivotal movement to cause a corresponding axial movement of said valve plunger, said piston having a greater diametrical clearance with said valve plunger than the maximum rise of said valve plunger actuator during such pivotal movement, thereby permitting said piston to float through its clearance so that any frictional sliding motion between said valve plunger actuator and piston will be minimized.

9. The servovalve of claim 3 wherein means are provided urging said piston against said valve plunger actuator with a load which is only slightly greater than the force required to move said valve plunger in said housing, thereby reducing to a minimum the friction load between said piston and valve plunger actuator during normal operation of said servovalve.

10. The servovalve of claim 3 wherein said predetermined small clearance is in the order of from .001 to .003 inch.

11. The servovalve of claim 3 wherein said piston has an enlarged flat head at the end which engages said valve plunger actuator and said axial bore is counterbored at that end to provide a seat for said flat head.